Oct. 20, 1970  J. A. PORTER, JR  3,535,501
DIGITAL FIELD SUMMING RECORDER
Filed July 10, 1967  4 Sheets-Sheet 3
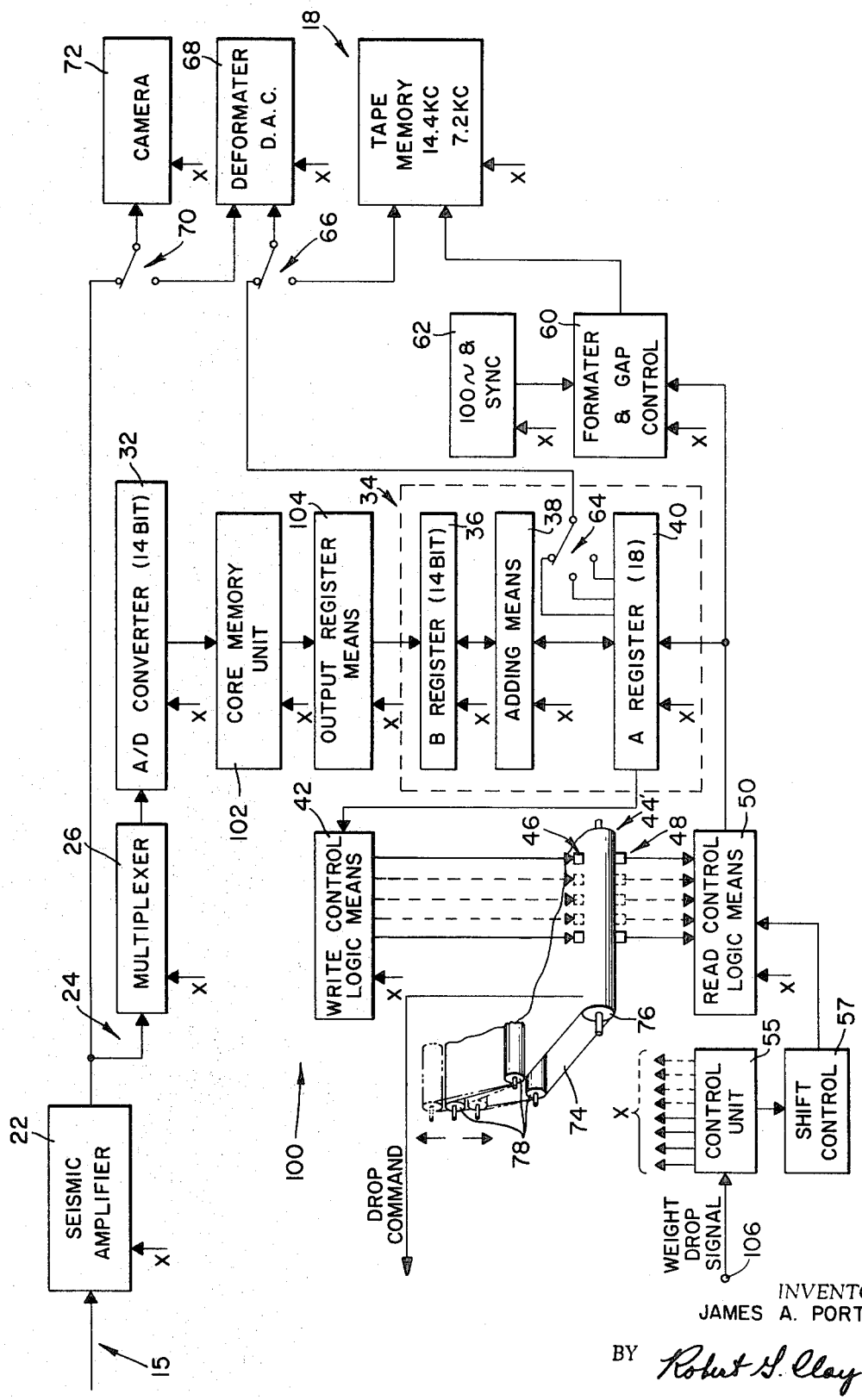
INVENTOR.
JAMES A. PORTER, JR.
BY Robert G. Clay
ATTORNEY Oct. 20, 1970  J. A. PORTER, JR  3,535,501
DIGITAL FIELD SUMMING RECORDER
Filed July 10, 1967  4 Sheets-Sheet 4
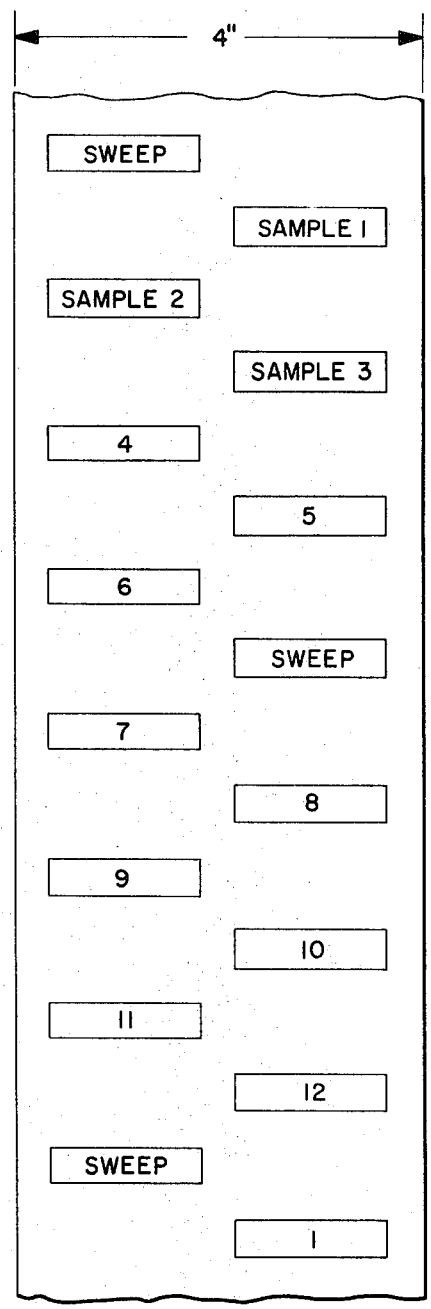
FIG_5
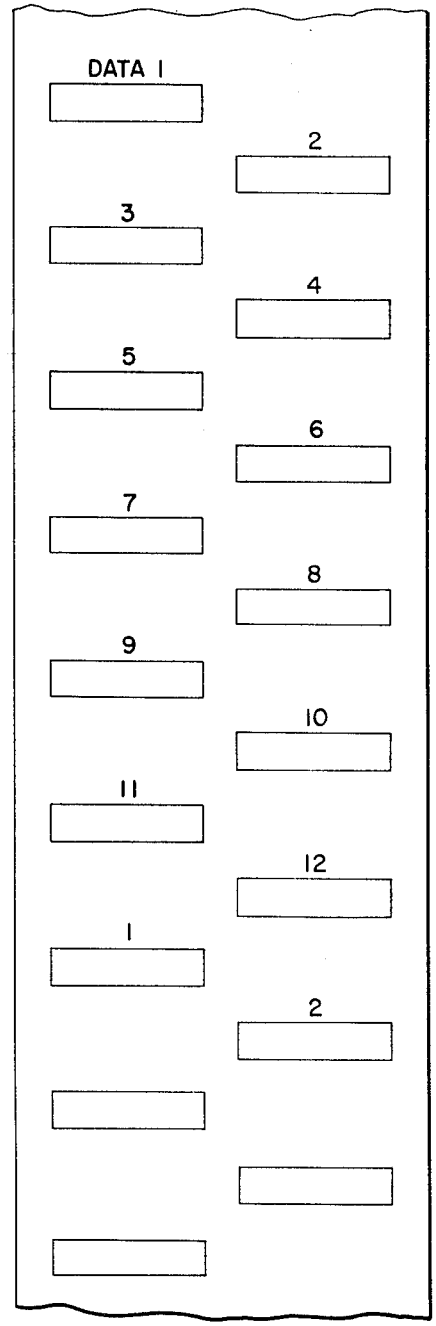
FIG_6
INVENTOR.
JAMES A. PORTER, JR.
BY *Robert H. Clay*
ATTORNEY United States Patent Office 3,535,501
Patented Oct. 20, 1970

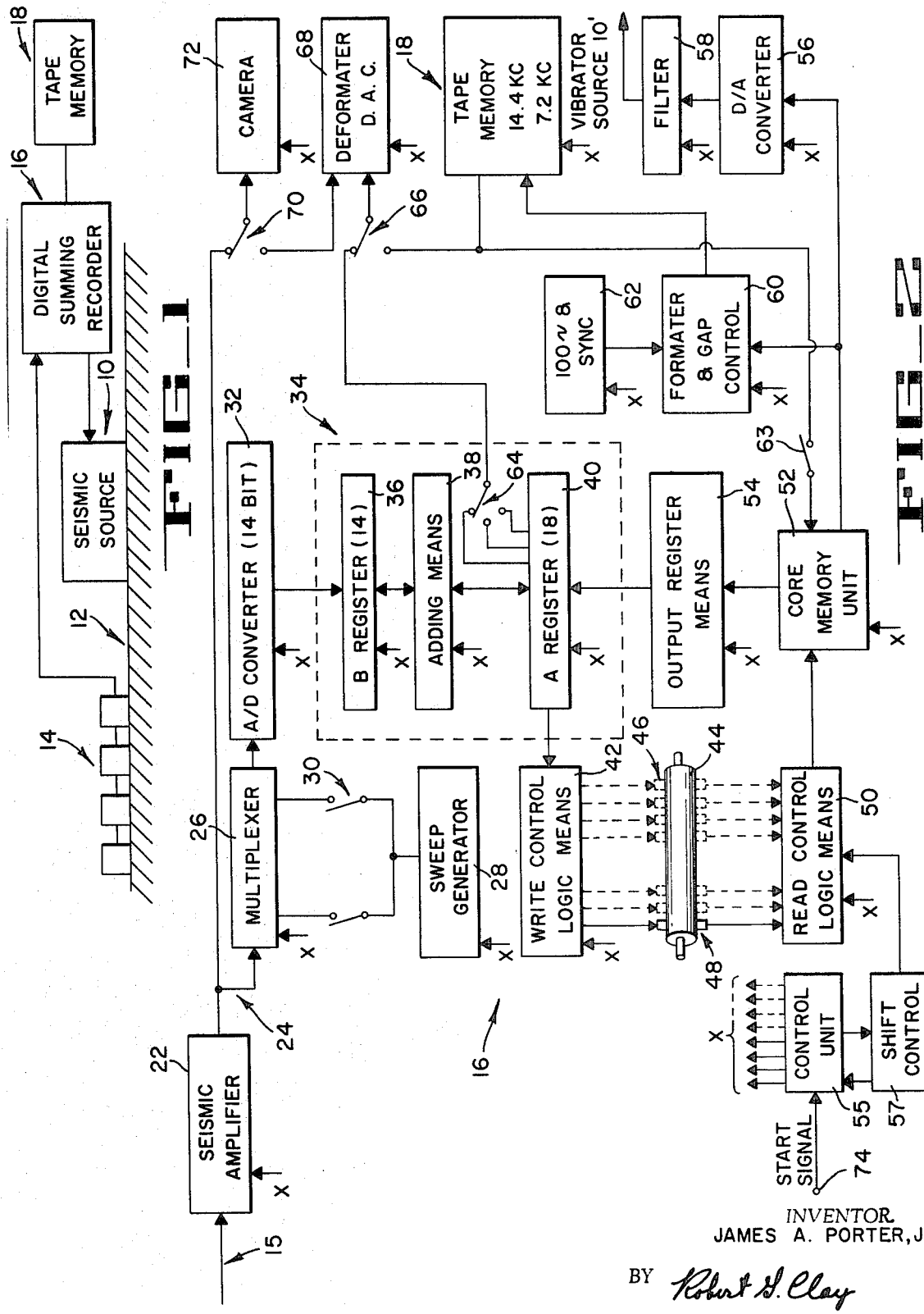

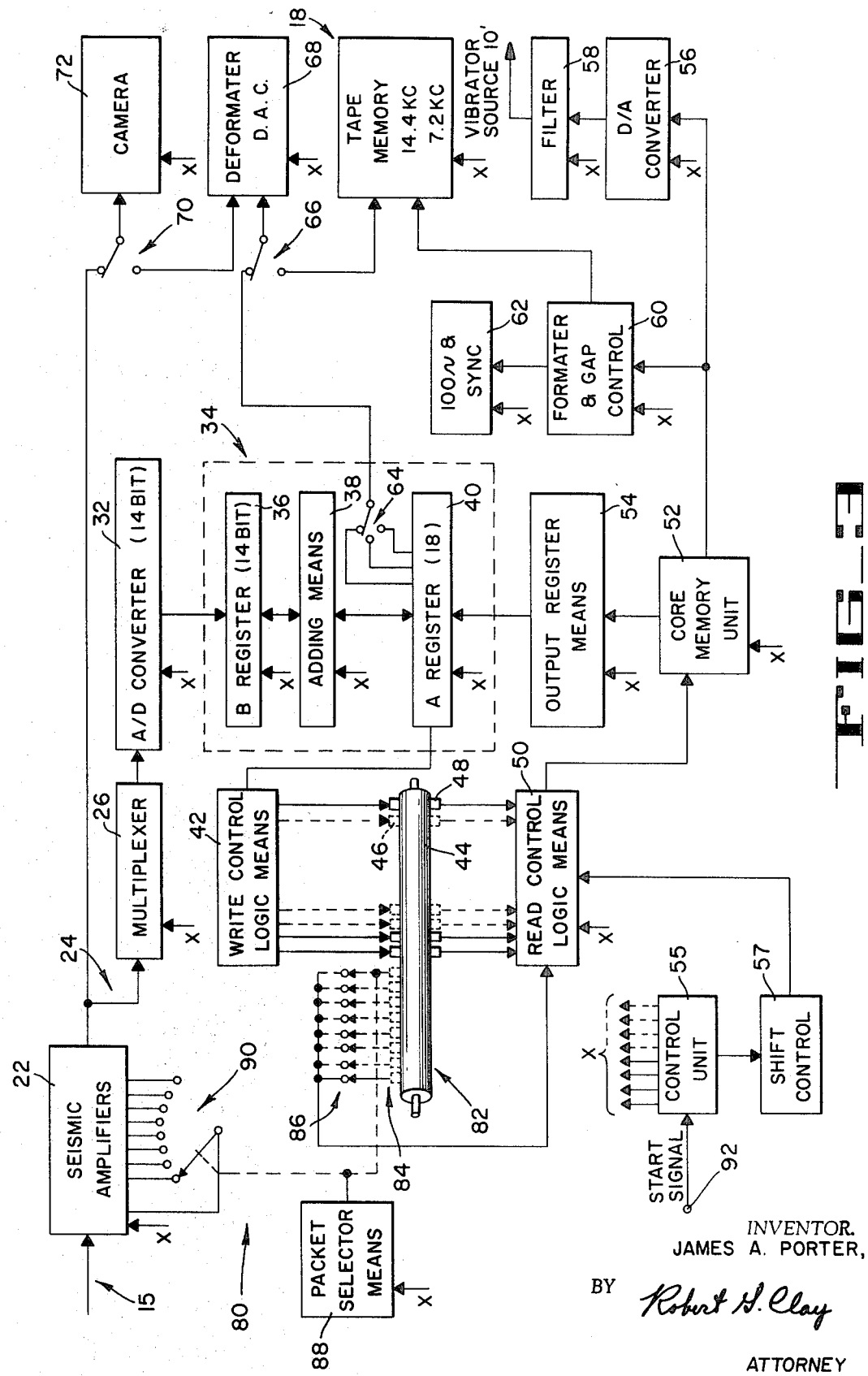

3,535,501
DIGITAL FIELD SUMMING RECORDER
James A. Porter, Jr., Houston, Tex., assignor to Mandrel Industries, Inc., Houston, Tex., a corporation of Michigan
Continuation-in-part of application Ser. No. 575,468, Aug. 26, 1966. This application July 10, 1967, Ser. No. 659,266
Int. Cl. G01v 1/24; G06f 7/38
U.S. Cl. 235—156                                                   12 Claims

ABSTRACT OF THE DISCLOSURE

Digital field recording and summing apparatus for summing seismic data in real time, utilizing inter alia an arithmetic unit, a temporary magnetic storage unit and a core memory unit to provide means for storing incoming seismic data, and then subsequently adding it to the next incoming seismic data, and repeating the sequence to provide a final summation of the entire seismic record. The final summation is then shifted to place the most significant bit in the most significant position, and is permanently recorded. The transfer of the final summation from the temporary storage to the permanent storage may be performed simultaneously with the recording of the first incoming data of the next seismic record. The apparatus also provides for the generation and subsequent recording of an excitation signal for precisely initiating the record taking.

CROSS-REFERENCES TO RELATED APPLICATIONS

This application is a continuation-in-part of application Ser. No. 575,468 to James A. Porter, Jr., filed Aug. 26, 1966, now abandoned and assigned to the same assignee.

BACKGROUND OF THE INVENTION

There are various systems in use at present for receiving and processing seismic signals at such time as the reflected signals are returned to the earth's surface. Typical among such systems are various analog devices which sum the seismic data in oscillograph form or on rotating drums. Such analog devices are limited in dynamic range and in summing accuracy. Furthermore, speed variations inherent in the rotating drum system introduce errors in the analog recording results. On the other hand there are various systems wherein the seismic data is recorded in digital form and is processed at some later date generally at a processing complex removed from the actual field area. Such recording and processing systems are cumbersome and inconvenient and result in the use of a very high volume of tape and associated expenses.

SUMMARY OF THE INVENTION

In a preferred embodiment, the invention provides seismic signal receiver, multiplexer and converter means which introduces the signal in digital form to an arithmetic unit formed of a "B" register, an adding means, and an "A" register. Means is provided for precisely initiating the transmission of the seismic signal. A mass storage unit is coupled to the "A" register output, and to the input via a core memory unit and output register means. A tape memory is coupled to the core memory unit via a formater and gap control circuit, and means for precisely initiating the transmisssion of the seismic wave is also coupled to the core memory unit.

The present invention overcomes the above-noted shortcomings of the prior art recording and/or processing systems by providing a digital field recorder capable of summing, in the field, seismic data generated by the various seismic exploration systems such as the types which utilize for example, dynamite explosions, weight drops, or vibrating surface sources, as the source of seismic energy. The invention thus provides for the generation and subsequent recording of an excitation signal which is free of any frequency changes due to speed variations of a rotating drum or storage system, wherein initial processing of the digital information is conducted simultaneously in the field. The generation of such an excitation signal allows a very accurate correlation process to take place subsequently when further processing the data in a computer. This feature, as well as the feature of providing an immediate summed output, with a very wide range of recording and low volume of tape, provides a relatively economical and accurate method of recording and processing seismic data. It is to be understood that although the invention is described in conjunction with seismic exploration systems, it may be utilized to record any data having a poor signal-to-noise ratio wherein the signal is repetitive in nature.

Accordingly, it is an object of the present invention to provide a digital field recorder and processor for seismic exploration systems of the type which employ surface vibrators, weight drop, marine sources, or dynamite explosions as the source of seismic energy.

It is another object of the invention to provide a digital field recorder having a relatively wide dynamic range, and capable of providing seismic records which are the summation of only the weighted sum of all seismic inputs; that is the seismic signals are first added and an average is then made of the summation.

It is a further object of the invention to provide a digital field recorder utilizing a core memory unit to buffer speed variations of rotating tape carriers.

It is another object of the invention to provide a digital field recorder having increased reliability and decreased maintenance which utilizes a magnetic tape moving at relatively slow speed as a temporary data storage means.

It is still another object of the invention to provide means for transferring a final summation of a series of seismic records to a permanent memory while simultaneously recording the first record of a succeeding series.

BRIEF DESCRIPTION OF THE DRAWINGS

FIG. 1 is a simplified block diagram of a seismic exploration system utilizing the apparatus of the present invention.

FIGS. 2 and 3 are block diagrams exemplifying alternative emobidements of the present invention which are adapted for use with seismic exploration systems employing surface vibrators as a source of seismic energy.

FIG. 4 is a block diagram exemplifying another alternative embodiment of the invention adapted for use with weight dropping exploration systems.

FIGS. 5 and 6 are diagrams depicting the formats used for information storage on the wide surface of the magnetic storage unit for the apparatus shown in FIGS. 2 and 4 respectively.

DESCRIPTION OF THE PREFERRED EMBODIMENTS

Referring now to FIG. 1 there is shown a seismic exploration system comprising essentially a source of seismic signals 10 for radiating a pre-selected sequence of seismic signals into the earth generally indicated by numeral 12. A plurality of receivers 14 are disposed on the earth's surface in a manner well known in the art, and are adapted to receive signals reflected from substrata and to introduce same to a digital field summing recorder 16 of the invention. The digital field summing recorder 16 is in turn connected to a tape memory system 18 wherein the summed seismic signals are recorded for subsequent utilization.

Referring now to FIG. 2 there is shown in block diagram, by way of example, one embodiment of the digital field summing recorder 16 and tape memory system 18 in accordance with the invention. The reflected seismic signals sensed by the receivers 14 are fed to a seismic amplifier 22 via a plurality of data channels 15 equal in number to the number of geophone arrays which form the spread of the receivers 14. Although the system is herein shown as having a single channel 15 of incoming analog data, it is to be understood that any number of analog data channels could be utilized; the number of data channels generally ranging from 12 to 14. It is also to be understood that the seismic amplifier 22 includes selected filters for individually accepting and filtering the various signals introduced to the seismic amplifier 22 via the plurality of channels 15, in a manner well known in the art. The output of the seismic amplifier 22 is routed through interconnecting cables 24 to a multiplexer 26 and from thence to an analog-to-digital converter 32. A sweep generator 28 is coupled to the multiplexer 26 via a switch 30. The sweep generator 28 provides for the generation of a sweep signal while on the field location, wherein the sweep signal is multiplexed into selected channels of the incoming plurality of channels to the multiplexer 26. For example, the invention herein contemplates the use of 14 channels to the converter 32, and the sweep signal is introduced to channels 1 and 8, thus providing 2 sweep and 12 data channels. To increase the sample rate thereof and as a result allow a smoother flow of information to the seismic vibrator source, the sweep signal is sampled at twice the sample rate of the data. In the event it is desirable to not utilize the sweep generator 28 the two selected channels reserve storage locations on a storage unit for prerecorded sweep signals, which are introduced thereto from the tape memory 18, as is further described hereinafter. The output from the multiplexer 26 is introduced to the 14 bit analog-to-digital converter 32 which is in turn connected to an arithmetic unit 34.

The arithmetic unit 34 comprises an augend or "B" register 36 which represents an augend function and has 14 bits, an adding means 38, and an addend or "A" register 40 which represents an addend function and has 18 bits. The converter 32 is connected to the input of the "B" register 36, which in turn is connected to the adding means 38. The adding means 38 is connected to the "A" register 40. The function of the arithmetic unit 34 is to algebraically sum, in binary form, the incoming seismic data as it is being received, to the previously summed seismic data which has been temporarily stored.

The "A" register 40 of the arithmetic unit 34 is connected to a write control logic means 42. The output from the write control logic means 42 is coupled to a magnetizable surface of a rotating or translating magnetic storage unit 44 via a plurality of write heads 46 disposed in magnetic bridging relation therewith. Although the storage unit 44 is herein shown as a drum recorder, it is to be understood that a tape recording device could be utilized in its stead, as further depicted in FIG. 4. A like plurality of read heads 48 are disposed in magnetic bridging relation with the surface of storage unit 44, and the signals sensed thereby are introduced to a read control logic means 50. The output from means 50 is introduced to a core memory unit 52 which in turn is connected to an output register means 54, an output of which is fed therefrom to the "A" register 40 in the arithmetic unit 34. A control unit 55 is connected to a shift control 57, which is in turn connected to the read control logic means 50. Note that the control unit 55 provides a plurality of control outputs herein indicated by letter $x$, which are introduced to each of the various blocks of the summing recorder 16 and to the memory 18 to provide means for timing and thus synchronizing the operation of the various components. The control unit 55 and shift control 57 together form a control logic system which senses the number of sums and provides the shift control.

The core memory unit 52 is also connected to a digital-to-analog converter 56, which in turn is connected to a suitable filter means 58, and from thence to a surface vibrator source 10' (not shown). This output from core memory unit 52 is additionally connected to a formater and gap control means 60 which is in turn connected to the tape memory 18. A 100 cycle and sync means 62 is also connected to the formater and gap control means 60.

To provide the pre-recorded sweep signals of previous mention, which may be utilized in place of the sweep signals from the sweep generator 28, the tape memory 18 is connected via switch means 63 to the core memory unit 52. Thus, although both the sweep generator 28 and connections for pre-recorded sweep signals are shown herein, it is to be understood that either of these sweep signal sources could be utilized as desired.

The "A" register 40 is additionally connected via a switch 64 and a switch 66 to a deformater digital-to-analog converter 68, the output of which is connected to one contact of yet another switch 70. Since the converter 68 has a capacity of 8 bits, it cannot handle the 18 bits from "A" register 40. Accordingly, switch 64 allows the selection and summation of seismic signals in "A" register 40 in three ranges of magnitude across the 18 bits of information accumulated therein. That is, it allows the selective summation of an upper, a middle or a lower range of 8 bits respectively of the "A" register's 18 bit width. Tape memory 18 is also connected via a contact of the switch 66 to the deformater digital-to-analog converter 68. The plurality of channels from seismic amplifier 22 in addition to being coupled to the multiplexer 26 are also fed to a second set of contacts on switch 70 whereby the analog seismic signals from the amplifier 22 may be introduced to a camera or recording oscillograph 72, to provide means for monitoring the signals as they are being received.

In operation, the sweep is loaded onto storage unit 44 by first placing a tape containing pre-recorded sweep signals on tape memory 18 and after searching for a desired recording, switch means 63 is closed. This allows the pre-recorded data on memory 18 to be read into unit 52 and also starts unit 44 rotating. As unit 44 rotates, the contents of unit 52, which now contains the sweep data, is written onto unit 44. The output of the multiplexer 26 is routed to the 14 bit analog-to-digital converter 32. When a start signal is introduced to the control unit 55 via a terminal 74, the control logic waits for the magnetic storage unit 44 to attain the desired relation between the heads 48 and the data (the sweep signal) that has been previously recorded on the unit 44, whereupon the unit 44 is started. As the data is read from the unit 44 by the heads 48 it is stored in the core memory unit 52. After a selected number of samples, e.g., 1,000, are stored in the core memory unit 52 the composite sweep signal is unloaded from the memory unit, is routed to the digital-to-analog converter 56, is filtered by filter means 58 and is transmitted to the seismic source, which in this case would be the surface vibrator source 10' (not shown) to energize same. Note that the storing of a number of samples in the core memory unit 52, such as 1,000 for example, will buffer any speed variations in the storage unit 44. At the same time, the channels of data introduced to the seismic amplifier 22 are sampled, multiplexed, digitized and placed in the "B" register 36 within the arithmetic unit 34. Since this would be the first record cycle the data is added to zero in adding means 38 and the sum is placed in the "A" register 40. Parity (odd) is generated via write control logic means 42, and the 19 bits are written on the storage unit 44 via the write heads 46. The sweep signal which is being transmitted to the surface vibrator source 10', is also recorded back on the storage unit 44 in its selected positions for use in subsequent cycles. At the end of the first excitation/record cycle the storage unit 44 contains the first seismic record corresponding to the first signals introduced to the plurality of channels from the receiver 14.

For the second and following seismic inputs, or records, the excitation signal is again started at such time as the storage unit 44 is in the selected position relative to the previously recorded data. After the memory unit 52 has stored a sufficient number of samples to buffer the storage unit 44 speed variations, the first data record corresponding to the first seismic record is removed from the core memory unit 52 and is placed in the "A" register 40, and the first sample of the second record is received in the "B" register 36. An add command from the control unit 55 is sent to the various components of the arithmetic unit 34 via the respective inputs $x$, and the addition process takes place therein. The resulting summation is accumulated in the "A" register 40, parity is formed via means, 42, and the 19 bits corresponding to the summation are recorded on the storage unit 44. This summation is recorded over the old data previously recorded on the unit 44. The read heads 48 are disposed approximately one inch before the plurality of write heads 46, and accordingly no unused data is destroyed. The sweep signal is again sent to the surface vibrator source 10' as it is clocked from the memory unit 52.

The above described cycle repeats itself until the required number of seismic records are summed and recorded on the storage unit 44. As the unit 44 continues to rotate, the summed data is read into the read control logic means 50, is checked for parity, and is then shifted by a command via the shift control 57 so as to place the most significant bit in the most significant position. The number of places shifted depends upon the number of records summed. For example, one record, 4 shifts; 2 records, 3 shifts; 4 records, 2 shifts; 8 records, 1 shift. The effect of this shifting is to divide the summed data by the number of summed records as previously mentioned, and to prepare the data for output to tape memory 18.

After the summed data has been divided (shifted) it is loaded into the core memory unit 52. The tape memory 18 is started via a command from the control unit 55, and after the header is written, the data is recorded onto the one-half inch tape in a gapped or ungapped format as desired. The core memory unit 52 stores the information from the storage unit 44 which is, in essence, arriving continuously, and periodically introduces the data therefrom to provide thus the necessary "buffer" to form gaps in the recorded information. The formater and gap control 60 provides the logic means for controlling when the data is transferred from the memory unit 52 to the tape memory 18. The number of samples to be recorded per record is selected by means of a patch card located in the control unit 55.

As the data from the plurality of input channels 15 is written on tape within the tape memory 18, a 100 cycles/second signal as well as a sync word is provided by the means 62, and is written on the tape following the 12 data channels by means of the formater and gap control means 60.

As may be seen, the data taken from the storage unit 44 is generally introduced to the tape memory 18 between periods of record taking. However, during the introduction and summation of the first record cycle, since no data is being read from the storage unit 44, the read control logic means 50, the core memory unit 52, the formater and gap control 60, and the tape memory 18 are not being used. Accordingly, by controlling the timing of the various components of the invention, the recording of the incoming first record can be effected simultaneously with the dumping of previously summed and divided data into the tape memory 18, thus providing a "continuous" mode of operation particularly useful in marine surveying. Thus there is no time lost during which recording is not taking place, since there is no need to stop recording in order to transfer the summed data from the storage unit 44 to the tape memory 18. However, the feature of simultaneous dumping and record taking is generally limited to those systems wherein $t_0$ can be predicted.

In performing the simultaneous record-dump technique, the core memory unit 52 sends out the sweep or the impulse control signal, with a known $t_0$, and also sends the summed data to tape memory 18 as described supra. Simultaneously, the incoming first record of the next summation, is sampled, multiplexed, digitized and placed in the "B" register 36 within the arithmetic unit 34, added to zero, and finally transferred to the storage unit 44 as previously described. Time sharing control for the continuous mode of operation is provided via the control unit 55, which can be set to automatically dump the summation of a full seismic record into the tape memory 18, after the final summation and during the subsequent occurrence of the next incoming first record.

It is noted that the magnetic storage unit 44 can be of any of the various known magnetic recording devices, such as for example, tape or drum recorders. However, by way of example only, the invention preferably employs a tape recording means which is modified to provide a closed loop of four inch wide magnetic tape 74, having a length for example, of from 40 to 125 inches (FIG. 4). The length of tape 74 is based upon, and thus determined by, the amount of seismic record time desired for each record, and the speed at which the tape is driven. Thus if the speed of the tape is chosen as 7½ inches/ second, a 40 inch length of tape would provide a record length of 5⅓ seconds, etc. The closed loop of tape 74 may be driven for example, by a rotating drum 76, whereby the tape extends therefrom to pass over various idler rollers 78 which are adjustable to accommodate the various lengths of tape which may be used. The write and read heads 46, 48, respectively shown in the FIGS. 2-4, may be disposed in rows against the circumference of the drum 76 and in magnetic bridging relation with the magnetic tape 74 as it passes therebetween over the drum.

The use of the relatively wide magnetic tape allows 42 tracks of information or data to be recorded in an NRZ–I format. As shown in FIGS. 5 and 6, the wide tape also allows the recording of a succession of two 19 bit samples thereon in side-by-side, alternating relation, each 19 bit sample extending 2 inches across alternate half widths of the tape thus helping to eliminate dynamic skewing. FIG. 5 shows in addition the recording of the sweep signals which are multiplexed into the first and eighth channels, and which are recorded as samples 1 and 8 in the tape format. Note in FIG. 6 that the weight dropping apparatus of FIG. 4 does not require the use of sweep signals and accordingly there is no provision in the wide tape format for recording sweep signals, and only 12 channels, i.e., samples of data are stored therein. The use of multiple channels of data on wide tape allows the storage of large amounts of data on a relatively shorter length of tape, while also reducing the required speed of the tape. Accordingly, the invention provides a field digital summing recorder with increased reliability and decreased maintenance requirements.

The various components shown in the figures, the combinations of which sets forth the concepts of the present invention, are electronic devices and circuits which are generally well known in the art and are thus not described in detail herein. For example, the seismic amplifier 22, the multiplexer 26, the various converters 32, 56 and 68, the sweep generator 28, the tape memory 18, the filter 58, and the camera 72 are any of the electronic circuits or devices generally known by, and readily available as individual devices to, those skilled in the art. By way of further explanation, parity check and parity generate circuits are provided at the various points of data transfer in the manner also known in the art, such points being for example, between "A" register 40 and write control logic means 42, read control logic means 50 and memory unit 52, and between memory unit 52 and the tape memory 18. Accordingly, means 42, 50 and memory unit 52 are provided with parity generate and parity check circuits.

As previously mentioned, the control unit 55 is adapted to provide all the necessary logical control functions needed to synchronize the operation of all the various components set forth as blocks in the various embodiments of FIGS. 2–4. The shift control unit 57, that is, the control logic of units 55 and 57, provides the necessary means for sensing the number of additions performed by the system, i.e., the number of seismic records compiled, and to shift the summed data an amount proportional to the number of additions. Thus, the summed data is divided by the average of all the summed seismic records as heretofore noted. The portion of the control unit which provides the above function may be a well known binary counter circuit, having means (a manually set switch, not shown) for selecting the number of records, as previously described hereinabove with respect to FIG. 2, whereby the number of records determines the number of places shifted. An operator sets the switch commensurate with the number of records he wishes to take, as is conventionally done in the field, which setting in turn sets the counter. The latter performs the number of corresponding counts before it delivers a command pulse to the shift control unit 57. The shift control unit is formed of a conventional logic circuit, which accepts the command pulse and shifts the summed data via the read control logic means 50 as described previously. The binary counter circuit and the shift control unit are well known in the art, and accordingly need not be further described herein. Typical counter and shift circuits are shown for example in: "Computer Handbook," Huskey and Korn, McGraw-Hill Book Company, Inc., 1962, section 15–7; and pp. 21, 89–91; 16–28; "Electronic Digital Computers," F. L. Alt, Academic Press Inc., 1958, sections 2.6, 3.2 (e.g., pp. 109 et seq.); "Computer Basics," vol. 4, Howard W. Sams & Company, Inc., 1962, chapters 6 and 7 (e.g., pp. 174 et seq., 186 et seq., 224–227); "Basics of Digital Computers," J. S. Murphy, vol. 1, John F. Rider Publisher, Inc., 1958, pp. 1–55, 2–13 et seq., 2–94 et seq., 2–114 et seq.

The formator and gap control means 60 which is made up of conventional logic circuitry, provides means for insuring that the proper identification labels as well as the required format are provided on the output tapes of memory 18. The gap control portion of the means 60 provides for the generation of inter-record gaps to facilitate the processing of the recorded tapes in short groups of records. Thus the means 60 is a form of shift register means and associated logic commonly employed to input data to a recording means. The circuit delays the introduction of selected data from the core memory unit 52 while generating, for example, a between-record gap, etc., on the tape, whereupon the means 60 introduces the data to the tape in the selected format. An example of a formater and gap control circuit is shown in U.S. Pat. No. 3,252,148, issued to R. W. Mitchell, Jr., May 17, 1966, and U.S. Pat. No. 3,074,636, issued to G. T. Baker et al., Jan. 22, 1963. These patents also give further examples of control circuits employed to control the sequence of operation of the associated system components.

Referring to FIG. 3 there is shown in block diagram an alternative embodiment of a summing recorder 80 in accordance with the invention, but particularly adapted for use with a surface vibrator source 10' such as that of FIG. 2, which source is herein particularly capable of generating a series of seismic signals having a preselected shape and timing sequence. The generation and radiation of such seismic signals is more particularly set forth for example, in co-pending U.S. application, Ser. No. 548,325, filed May 6, 1966, now U.S. Pat. No. 3,332,512, issued July 18, 1969, and assigned to the assignee of this application.

Accordingly, the summing recorder 80 provides essentially the same circuitry as that of FIG. 2, wherein however, the circuit is adapted with additional means for providing the series of seismic signals and for selecting and introducing such signals (hereinafter termed "packets") to the vibrator source 10' in the required timed sequence. Thus, as further described in the U.S. Pat. No. 3,332,512, a plurality of wave packets of selected shape and duration are pre-recorded on an added or selected portion 82 of the storage unit 44. A like plurality of heads, or preferably a single, stepping head 84, is disposed against the portion 82 to readout the packets a selected plurality of times and in a selected sequence. Accordingly, the packets are selected via a packet selector switch 86 which steps the head 84, and are introduced to the read control logic means 50, to the core memory unit 52, to the digital-to-analog converter 56, the filter means 58 and from thence to the vibrator source 10'. A packet selector means 88 is coupled to the packet selector switch 86 and provides for stepping control of the switch 86 to thus determine the selection of the sequence of packets. The packet selector means 88 likewise is coupled to a filter selector switch 90 which is connected to the seismic amplifier 22. Switch 90 allows the selection of a filter of a plurality of filters (not shown) in the amplifier 22, which filter has a bandwidth commensurate with the bandwidth of the packet which is to be radiated.

In operation, at such time as the storage unit 44 is in the required position for recording, a start signal is introduced to the control unit 55 via a terminal 92, and the unit 44 is started. The read head 84 is stepped to the first position, i.e., to a position to allow it to read the first packet recorded on the portion 82 of the storage unit 44, by means of the packet selector means 88 and switch 86. Thus as the unit 44 rotates the first packet is read from portion 82, is introduced to the read control logic means and from thence is fed to the memory core unit 52, whereupon it is introduced as a driving signal to the vibrator source 10' via the digital-to-analog converter 56 and filters 58. The packet selector means simultaneously selects the required filter in seismic amplifier 22, which filter has a bandwidth commensurate with the bandwidth of the radiated packet. The first packet may be radiated any number of times to build up the signal before the head 84 is stepped to the next packet via the selector means 88, as known and described in the U.S. Pat. No. 3,332,512. At such time as the packet signal is generated and radiated by the surface vibrator source 10', the control unit 55 starts the operation of the multiplexer 26 and the converter 32, which begin to operate on the incoming data reflected by the substrata. The sequence of operations of the arithmetic unit 34, the storage unit 44 and the memory unit 52, as well as the remaining components of the summing recorder 80, is thereafter essentially the same as that previously described with reference to the recorder 16 of FIG. 2.

Referring now to FIG. 4 there is shown an alternative summing recorder embodiment 100 of the invention adapted for use with a weight dropping seismic exploration system. Note that the circuitry is very similar to that shown in FIG. 2, with the exception of a few components which have been deleted and a few which have been rearranged in the circuit. Thus a core memory unit 102 and an output register means 104 similar to the memory unit 52 and the register means 54 respectively of FIG. 2, are inserted between the 14 bit analog-to-digital converter 32 and the arithmetic unit 34. Since it is no longer necessary to provide an energizing signal to a vibrating surface source, the digital-to-analog converter 56 and the filter 58, as well as the sweep generator 28, shown in the summing recorder 16 of FIG. 2, are deleted from the recorder embodiment 100 of FIG. 4. Note in addition, that the storage unit 44 of FIGS. 2 and 3 is herein depicted as a tape storage unit 44', which utilizes the closed-loop wide tape 74 of previous mention. One or more of the rollers 78 may be adjustable to allow the use of various lengths of tape 74.

The operation of the summing recorder 100 is likewise essentially the same as the operation previously described in conjunction with FIG. 2. However, the initiation of the recording sequence is somewhat different when utilizing the weight drop technique for the generation of seismic energy signals. Accordingly, to start the system, the control logic waits until the storage unit 44' attains the desired relation between the write heads 46 and the start of the storage unit 44' recording medium, at which time a start or drop command is sent from the unit 44' to the weight truck (not shown). The weight is dropped and upon energizing a weight drop switch (not shown) a signal is introduced to a terminal 106 and thence to the control unit 55. The control unit 55 starts operation of the multiplexer 26 and the analog-to-digital converter 32, which begin to operate on the incoming data, viz, the reflected seismic signals generated by the weight drop. The data from the multiplexer 26 and converter 32 is temporarily stored in the core memory unit 102. In the first drop, the incoming data from the memory unit 102 is added to all zeros within the arithmetic unit 34 and is recorded on the storage unit 44'.

For the second and following input cycles, the drop signal is again started by the storage unit 44' being in the selected position relative to the start of the magnetic medium and to the seismic data previously recorded therein. The control unit 55 starts the multiplexer 26 and the converter 32, and allows the second drop data to flow into the memory unit 102. Data is accumulated in the unit 102 until the first sample of the first drop is read from the unit 44'. This accumulation of data insures the alignment of time $t_0$ between the first drop and subsequent drops, where time $t_0$ is the time the weight drop hits the earth. At this time the first sample of seismic data from the first drop is removed from the storage unit 44' and is placed in the "A" register 40, and the first sample of the second drop is removed from the memory unit 102 and is placed in the "B" register. An add command from the control unit 55 (outputs $x$) is sent to the arithmetic unit 34 and particularly to the adding means 38 and the addition process takes place. The result is accumulated in the "A" register, parity is formed and the 19 bits of summed information are recorded on the storage unit 44' over the old data from the first drop. As previously noted, since the read heads 48 are placed approximately one inch in front of the write heads 46, no unused data is destroyed.

The cycles continue to repeat and the accumulation and recording of data is thus continued until the required number of weight drops are performed and the resulting seismic signals are recorded in the same manner as heretofore described relative to the system of FIG. 2.

Although the core memory unit 102 and output register means 104 are shown disposed between the A/D converter 32 and the arithmetic unit 34 in FIG. 4, it is to be understood that these two units may be placed between the read control logic means 50 and the arithmetic unit 34 instead, as previously described with reference to FIGS. 2 and 3. The operation of the various components is accordingly similar to the operations previously described in conjunction with the systems of the previous figures, wherein as previously described similar components have similar functions.

Although the present invention has been described herein with reference to several embodiments it is to be understood that various modification may be made thereto within the spirit of the invention, and that accordingly it is not intended to limit the invention except as defined in the following claims.

What is claimed is:
1. A digital field summing recorder for summing seismic data in real time and adapted for use with seismic exploration systems having a seismic energy source and a plurality of channels of seismic signal receiving means, the combination comprising:
   input means coupled to said signal receiving means and adapted to amplify, filter and multiplex said plurality of channels of seismic signals generated by said seismic energy source;
   converter means coupled to said input means for converting the incoming multiplexed seismic data to digital data form;
   arithmetic unit means having a pair of inputs and at least one output operatively coupled at one input directly to said converter means;
   memory means operatively coupled to the other input of said arithmetic unit means;
   storage means operatively coupled between the output of said arithmetic unit means and said memory means for temporarily storing the data received from said arithmetic unit means;
   said memory means being coupled to said storage means and adapted to store a selected number of samples received therefrom prior to writing data in the storage means;
   said arithmetic unit means being adapted to algebraically sum in binary form the incoming seismic data from the converter means as it is being received, to the previously stored seismic data introduced from said storage means via said memory means;
   control logic means including binary counter means operatively coupled to said storage means for sensing the number of seismic data records compiled and for shifting the summed data an amount proportional to the number of additions performed by said arithmetic unit means to form a final seismic record composed of the summation of only the weighted sum of all seismic inputs; and
   recording means including formater control means coupled to the memory means for receiving the shifted summed data and permanently recording same in the form of said final seismic record.

2. The digital field summing recorder of claim 1 wherein said arithmetic unit means comprises an augend register coupled to the converter means, and adding means operatively connected to said augend register, and an addend register operatively coupled between the adding means, the storage means, and the memory means.

3. The digital field summing recorder of claim 2 wherein said storage means further comprises a translatable magnetic surface having a plurality of read and write heads disposed in magnetically communicating relation therewith, a write control logic means coupled between said plurality of write heads and said addend register, and a read control logic means coupled between said plurality of read heads and the memory means.

4. The digital field summing recorder of claim 3 wherein said storage means further comprises a plurality of selected seismic signals pre-recorded in a portion of said magnetic surface, and magnetic head disposed against said surface and adapted to selectively reproduce the pre-recorded seismic signals in a desired sequence for subsequent introduction to said seismic energy source.

5. The digital field summing recorder of claim 4 wherein said input means further includes a plurality of filters of bandwidths corresponding to the frequencies of the pre-recorded seismic signals, a selector means for stepping said magnetic head to a selected position against the magnetic surface to reproduce the plurality of pre-recorded seismic signals and to simultaneously select the corresponding filter of the plurality of filters.

6. The digital field summing recorder of claim 3 wherein said translatable magnetic surface further comprises a rotatable drum, a closed loop of magnetic tape disposed about said rotatable drum and extending therefrom to pass over various guiding and tension rollers, said plurality of read and write heads being disposed in radially extending relation to said drum and in magnetically communicating relation to the tape therebetween.

7. The digital field summing recorder of claim 6 wherein said magnetic tape loop has a width of the order of 4 inches, and the data stored in the tape is disposed in alternately arranged succession of samples, each sample extending over approximately half of the tape width with a selected spacing therebetween.

8. The digital field summing recorder of claim 3 further comprising a formater and gap control means including means for providing a signal of selected frequency and a sync word for recording on the recording means, the formater and gap control means being operatively connected between said recording means and the memory means to control the selective introduction of shifted summed data to said recording means with predetermined identification and recorded tape format.

9. The digital field summing recorder of claim 3 further comprising:
   means for generating a sweep signal at twice the sample rate of the data and selectively combining same with said seismic data for temporary storage in said storage means;
   said memory means including core memory means and output register means serially connected between the read control means and the other input to the arithmetic unit means;
   digital-to-analog converter means including filter means connected between said core memory means and said seismic energy source to receive the sweep signals from the storage means via the core memory means and to convert the sweep signals to analog form for introduction to said seismic energy source to energize same and generate the seismic signals.

10. The digital field summing recorder of claim 3 wherein said storage means includes recorded signal means for producing a drop command signal for introduction thereof to said seismic energy source to initiate operation thereof, and means for providing a start signal to said control logic means in response to operation of the source.

11. The digital field summing recorder of claim 3 wherein said translatable magnetic surface further comprises a closed loop of magnetic tape adapted for translation by a bin-type tape transport.

12. The digital field summing recorder of claim 3 wherein said control logic means further includes means coupled to the storage means, the memory means and the recording means for controlling the timing of the various components of the recorder to effect the transfer into said recording means of a previously summed and divided final record simultaneously with the recording of the first incoming record.

References Cited

UNITED STATES PATENTS

| | | | |
|---|---|---|---|
| 3,340,499 | 9/1967 | Hadley | 340—15.5 |
| 3,437,991 | 4/1969 | Porter | 340—15.5 |
| 3,440,599 | 4/1969 | Waters et al. | 340—15.5 |

OTHER REFERENCES

Chu: Digital Computer Design Fundamentals, McGraw-Hill, 1962, pp. 12, 13.

MALCOLM A. MORRISON, Primary Examiner

C. E. ATKINSON, Assistant Examiner

U.S. Cl. X.R.

181—.5; 235—164; 340—15.5